United States Patent [19]

Feola

[11] Patent Number: 5,400,614
[45] Date of Patent: Mar. 28, 1995

[54] FROZEN DESSERT APPARATUS

[76] Inventor: Anthony V. Feola, 11 Squire Rd., Winchester, Mass. 01890

[21] Appl. No.: 928,452

[22] Filed: Aug. 12, 1992

[51] Int. Cl.6 ............................................. F25C 1/10
[52] U.S. Cl. ...................................... 62/233; 62/135; 62/136; 366/102; 366/149; 426/95
[58] Field of Search ................... 426/95, 98, 100, 101, 426/306, 307; 425/91, 155; 118/25; 366/149, 102; 62/341, 342, 135–136, 233; 99/452, 453–455

[56] References Cited

U.S. PATENT DOCUMENTS

| 2,925,347 | 2/1960 | Cummings et al. | 426/306 |
| 3,677,443 | 7/1972 | Smadar et al. | 222/94 |
| 3,898,859 | 9/1975 | Duke | 62/135 |
| 4,427,703 | 1/1984 | Schäfer et al. | 426/101 |
| 4,645,093 | 2/1987 | Jones | 221/93 |
| 4,707,997 | 11/1987 | Bigler et al | 62/341 |
| 4,758,143 | 7/1988 | Lopes | 425/91 |
| 4,910,030 | 3/1990 | Trojahn | 426/101 |

OTHER PUBLICATIONS

Julia Child, Louisette Bertholle, Simone Beck; Mastering the Art of French Cooking (vol. one), 1974 Knopf inc, New York, pp. 177–180.

Primary Examiner—Donald E. Czaja
Assistant Examiner—Mary S. Mims
Attorney, Agent, or Firm—Ellen C. Childress

[57] ABSTRACT

Equipment and a process for volumetric filling of novelties with soft frozen desserts is disclosed.

6 Claims, 8 Drawing Sheets

FROZEN DESSERT APPARATUS

FIELD OF THE INVENTION

This invention relates to filled frozen desserts and a process and apparatus for preparing them.

BACKGROUND OF THE INVENTION

Pastry is a malleable medium allowing for infinite variation from a sturdy crust which supports a pie filling to a pate feuilletee with multiple crisp layers. Basic pastry contains flour, shortening and water (a short paste), with an optional egg (Pate a foncer). A rich pastry containing sugar is known as pate sucree. For pate feuilletee (leafy or puff pastry) a dough of flour and water is rolled and folded around butter and rolled and folded several times more in a manner that produces $3^6$ layers. It is then typically cooked into rectangles, cut in half and filled with pastry cream, and frosted with a confectioners' vanilla frosting over the top, and then piped with a chocolate and butter mixture to form Napoleons.

Pate A Choux, or cream puff, pastry is used for making large cream puffs, small cream puffs (profiteroles), and eclairs. A recipe for a small amount is given as follows: Bring 250 ml of water, 1 cm$^3$ of salt and 125 ml. of butter rapidly to a boil. A small amount of sugar may be added for a slightly sweet batter. Add 250 ml of sifted wheat flour all at once, remove the mixture from the heat, and stir hard until the batter stiffens and draws away from the sides of the pan, forming a compact ball. Return the mixture to the heat and stir vigorously for 1 min. Remove and let stand for 2–3 min. Beat in 4 large eggs, one at a time. Beat 1 min with an electric mixer after each addition. After all eggs are added, beat for 5 min. Let stand at least 1 hour in a cool place. Extrude into rounds (for puff shells) or strips (for eclairs) onto a lightly greased pan. Bake in an initially very hot oven, then in a moderate oven until shells feel firm and dry. Cool thoroughly before using. The directions specifically state to fill just before serving so that the shells won't get soggy. To fill, the shells are either pierced or cut in half and filled with pastry cream, sweetened whipped cream, or ice cream using a scoop or a pastry bag. An alternative method of producing puff shells can be found in U.S. Pat. No. 3,441,418 incorporated herein by reference.

While there are many makes and designs of machines for continuous freezing of soft desserts, most of them operate on a similar principle. A mixture of milk products, sugar, gelatin or similar thickener, flavors, corning, nuts, fruits, syrups and sometimes eggs for both flavor and whipping ability is fed into a metal cylinder around which a compressed gas, often freon, is expanded, making the metal surface very cold. Ice crystals freeze to the surface and while yet quite small, they are scraped off by sharp blades revolving around the interior of the cylinder. Part of the scraping assembly is a beating arrangement that whips in air, thus increasing the volume of the mixture. The assembly moves the frozen dessert to the discharge mechanism as well.

The incorporated air is known as "overrun". While a regular ice cream may have 100% overrun, which means 50% of air by volume, a soft ice cream usually has 30–80% overrun, which means 20–40% of air by volume. To provide prompt freezing when needed, the mix should be stored at close to freezing temperature and kept adequately refrigerated in the freezer storage tank.

A wide variety of commercial extruders for soft frozen desserts exists, most of which are designed for use at the retail sales level to dispense soft frozen desserts, including frozen yogurt, into cones and dishes. Such dispensers can be found in U.S. Pat. Nos. 4,412,428, 4,707,997, 4,796,784, and 4,544,085, incorporated herein by reference and UK Patent application GB 2,234,556. The amount of dessert dispensed is Generally dependent upon the length of time and degree of movement a lever or delivery tap is pushed. Such taps can be found in U.S. Pat. Nos. 3,868,050, 4,711,376 and EP 285,709 A1.

Especially for commercial production, but also valuable at the retail level is the desirability for volumetric extrusion of food material. One approach to this is disclosed in U.S. Pat. No. 4,671,429.

Volumetric injection of extruded food material into a confectionery is disclosed in U.S. Pat. Nos. 4,752,488 and 4,788,071, incorporated herein by reference, both issued to Torshiko Hayashi.

In U.S. Pat. No. 4,752,488, a plunger creates a vacuum sucking the material from a hopper into a discharge chamber using a 3-way valve, and then dispenses the material through a reciprocating injection nozzle. The length of the filling nozzle can be adjusted.

U.S. Pat. No. 4,788,071 discloses a method for quantitatively extruding food materials having large chunks, by moving a piston through a cylindrical space in a hopper.

Pistons are used to aid in the extrusion of frozen desserts in a variety of ways. U.S. Pat. No. 4,580,905 discloses a piston which combines mixing and dispensing functions. UK Patent Application GB 2,172,541 discloses a plunger coordinated with an iris for forming geometrically shaped ice cream pieces.

A cooling tunnel consists of an insulated passage placed around the conveyor to let the product travel through it in a continuous flow. Cold gas is supplied to this passage to cool the product. To achieve maximum heat transfer from the gas to the product, a counterflow principle is used whereby air is introduced at the product exit of the tunnel and withdrawn at the product entrance of the tunnel so that the direction of the air flow is opposite to the direction of the food flow.

It is the objective of the disclosed invention to provide a frozen dessert and method for making such. It is a further objective of the disclosure to present an apparatus capable of rapid, repeatable volumetric dispensing and/or injection of soft serve desserts.

SUMMARY OF THE INVENTION

Pastry shells are filled quantitatively with a frozen comestible, preferably a flavored yogurt, iced and then immediately quick frozen in a nitrogen tunnel. If nuts are applied before freezing a portable cream puff sundae is created. When eaten at room temperature, the pastry shell, thawing prior to the frozen comestible, but being frozen with sufficient speed to prevent significant absorption of liquid from the comestible, has a texture which tends to tear rather than flake.

For quality control and speed, an air piston, actuated by pressure of the pastry shell against a plate dispenses a volumetric amount of the yogurt into the shell quickly. Alternatively, the dispensing action may be controlled by a foot pedal. The spout for insertion into the shell is interchangeable and for elongated forms such as an eclair, is equipped with side openings to more evenly distribute the filling.

While the dispensing apparatus is particularly useful in the above applications it has potential use in retail and vending machine trade.

The subject apparatus is a soft serve machine with batch feed for ingredients (input); the machine converts the ingredients via a refrigeration cycle to a frozen dessert. The frozen dessert is dispensed via operation of a tap lever that opens a dispensing tap to discharge dessert as long as the handle is depressed in the "on" position. The dessert is thus dispensed into a receptacle such as a cone, for instance. The receptacle is filled manually and nonuniformly, by judgement of the operator. The result is that the volume of dessert that is served is not constant. Some servings are more than others. To avoid short changing, wasteful excess is used in order to avoid customer complaints and erosion of customer good will and loyalty To overcome the shortcomings of manual dispensing of soft frozen desserts with inherent nonuniformity and wastefulness, an automatic, highly accurate, uniform discharge method utilizing volumetric portion control is presented. Further adaptation of the dispensing port is made for filling a variety of comestibles.

In one embodiment, the apparatus comprises a linear actuator comprised of a cylinder and piston, operated by two electrically controlled solenoid air valves and associated compressed air lines. The solenoid is actuated by relay from a plate or foot pedal. The rod of the linear actuator is connected by a partially rotatable link to a dispenser tap lever of the soft dessert server. A time delay relay controls the period of time between strokes of the piston. When the tap lever is depressed, frozen dessert is extruded from a discharge port. The discharge port has been adapted to accept a variety of nozzles or a hose, for filling pastries. This embodiment can be used to convert existing soft serve machines.

DETAILED DESCRIPTION OF THE INVENTION

Figure 1:
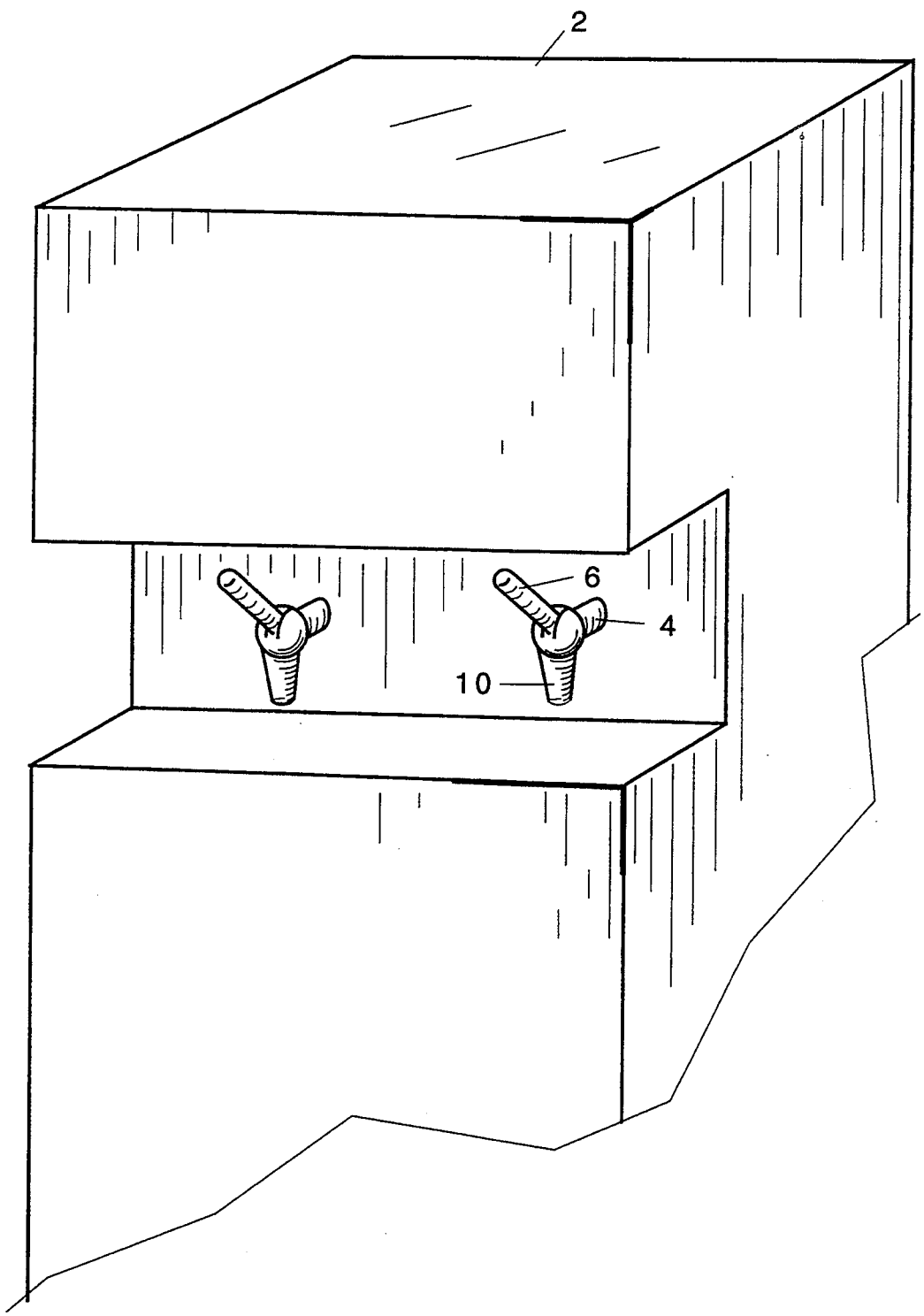
FIG. 1 is a perspective view of a manually operated soft serve dessert machine.
Figure 2:
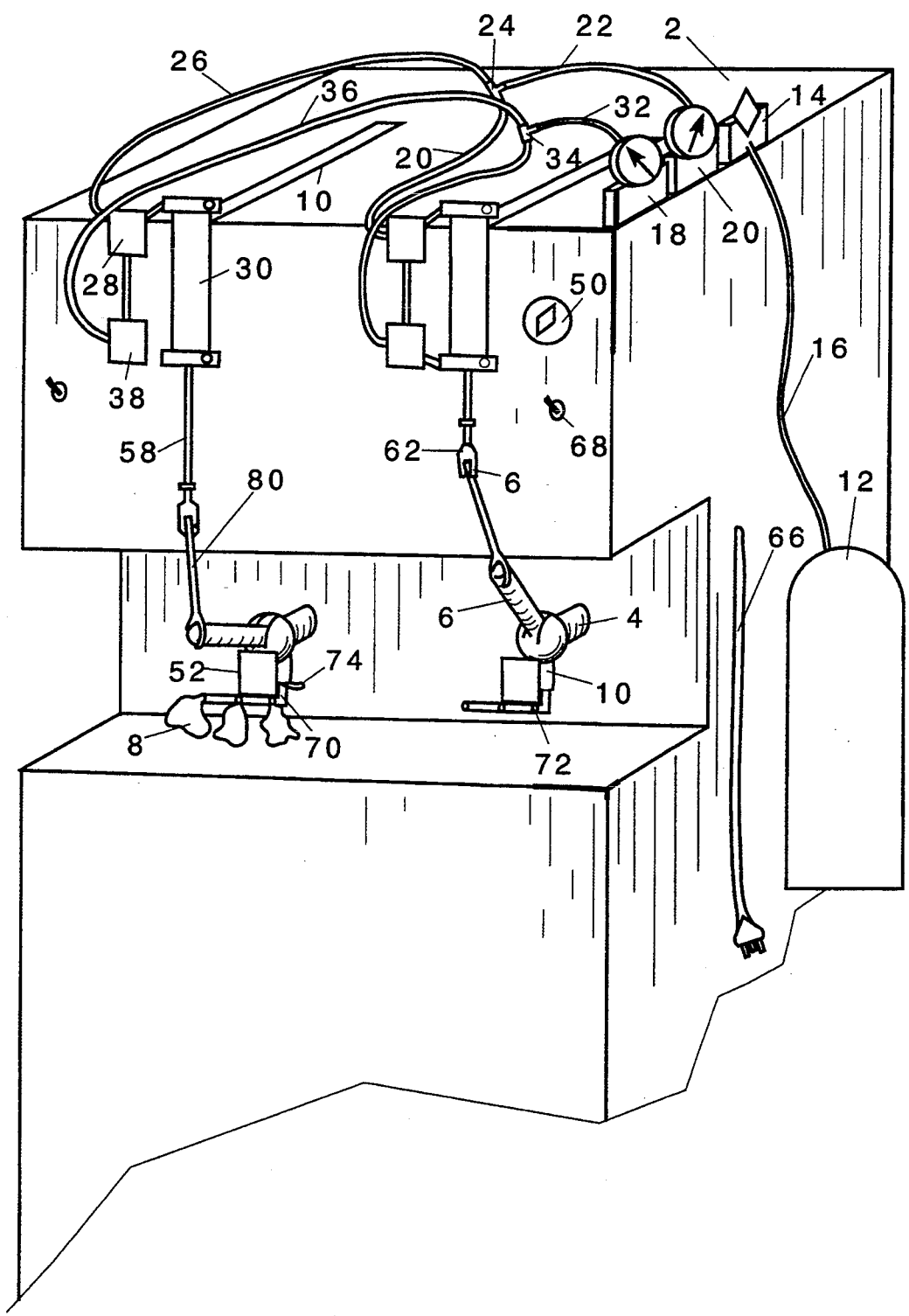
FIG. 2 is a perspective view of a soft serve dessert machine adapted for volumetric filling of eclairs.

FIG. 1 represents a commercially available soft serve dessert machine. A cabinet 2 encloses a compressor and mixer for soft serve desserts such as ice cream or frozen yoghurt. The dessert exits the machine through passage 4 to the tap. When dispenser tap lever 6 is depressed, dessert 8 is dispensed out port 10.

A Taylor soft serve ice cream machine, was used to produce ice cream and store it. The formerly manual discharge, was converted to automatic dispensing and filling of pastry from two dispensers. The conversion is readily adaptable to any number of ports.

Compressed air 12 is supplied to an air manifold 14 by an air hose 16 where it is regulated to operating pressure via pressure gage regulators 18 and 20. Two regulators are preferable since pressure for a downward stroke is less than pressure for an upward stroke due to gravity.

Regulated air from gage 20 passes through a hose 22 and is divided into two streams by a T 24. It then travels through hose 26 to the inlet port of a first electrically operated solenoid air valve 28 connected to the upper end of a cylinder 30 supported by a support 102a.

Regulated air from gage 18 passes through a hose 32 and is divided into two streams by a T 34. It then travels through hose 36 to the inlet port of a second electrically operated solenoid air valve 38 connected to the lower end of a cylinder 30.

In the "off" position, that is with no dessert 8 flowing, first air intake 40 is closed and first air discharge 42 is open; second air intake 44 is open and second air discharge 46 is closed. Air pressure from gauge 18 moves internal piston 48 upward. Upward movement of the piston 48 is transferred along the linkage, urging tap connection link 80 and engaged tap lever 6 through snap on linkage fork 56 upward.

In the "on" position first air intake 40 is open and first air discharge 42 is closed; second air intake 44 is closed and second air discharge 46 is open. Air pressure from gauge 18 moves piston 48 downward. Downward movement of the piston 48 is transferred along the linkage, urging tap connection link 80 and engaged tap lever 6 downward.

A setting is made on a timer relay 50 corresponding to the time needed to fill a given pastry. Individual pastries typically use from 25–170 gm of filling. This delay time controls the volume of flow. However, the flow may be further regulated by installation of an iris (adjustable aperture) in the exit port of the machine 10. When an activator plate 52 is pressed, a circuit is completed initiating the cycle and the solenoid valves move to the "on" position. The plate 52 may be positioned in proximity to the discharge port 10 to be activated by pressure from a pastry shell 54 or positioned by cable in a foot pedal for remote operation. The circuit may also be completed by a coin box to allow for a soft serve vending machine. At the end of the time cycle, after volumetric fill is complete, the valves quickly move the piston 48 to the "off" position.

Figure 4:
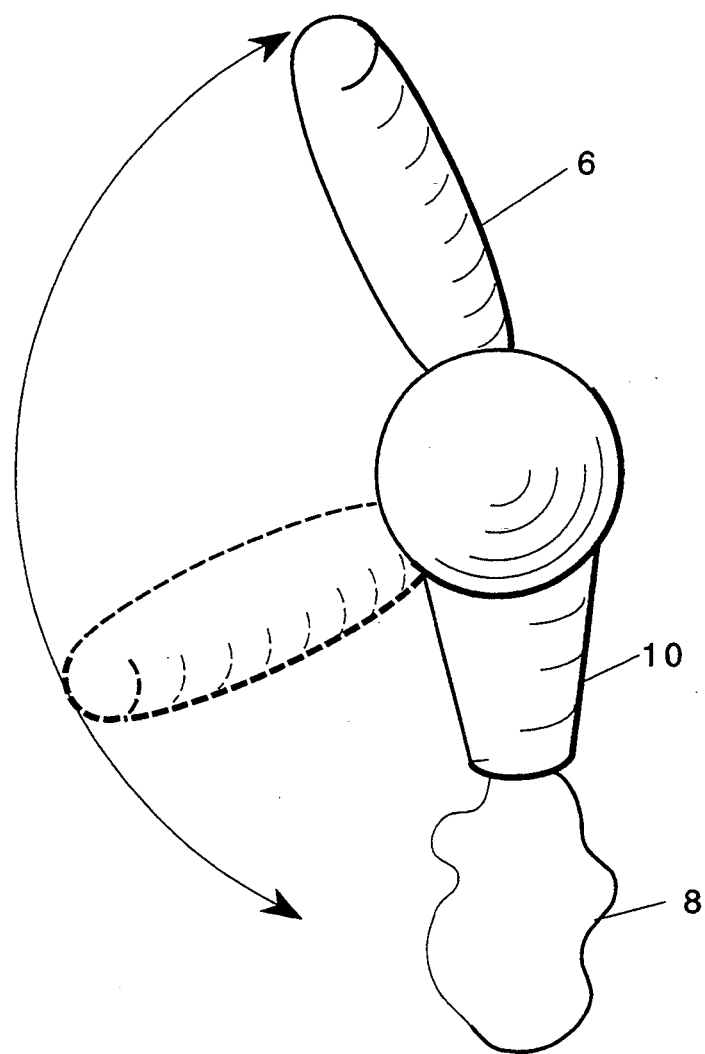
FIG. 4 is a view of a dispenser tap showing non-linear displacement.

FIG. 4 shows the path traversed by a tap lever. If the linear motion of an actuator such as the cylinder and piston is transferred directly to the outer terminus of the tap lever 6 traveling in an arc, the apparatus would bind. To minimize the amount of horizontal motion that must be accommodated, alignment of a piston over a path that divides play in equally in two directions is desirable. Further, linkage from the piston 48 to the tap lever 6 should allow for limited rotation about an axis. If at the beginning, at the end, and half way through the piston motion, the greatest rotation is encountered, then at a quarter and at three quarters of the way through the piston motion, linkage should be nearly in line with the piston.

Figure 3:
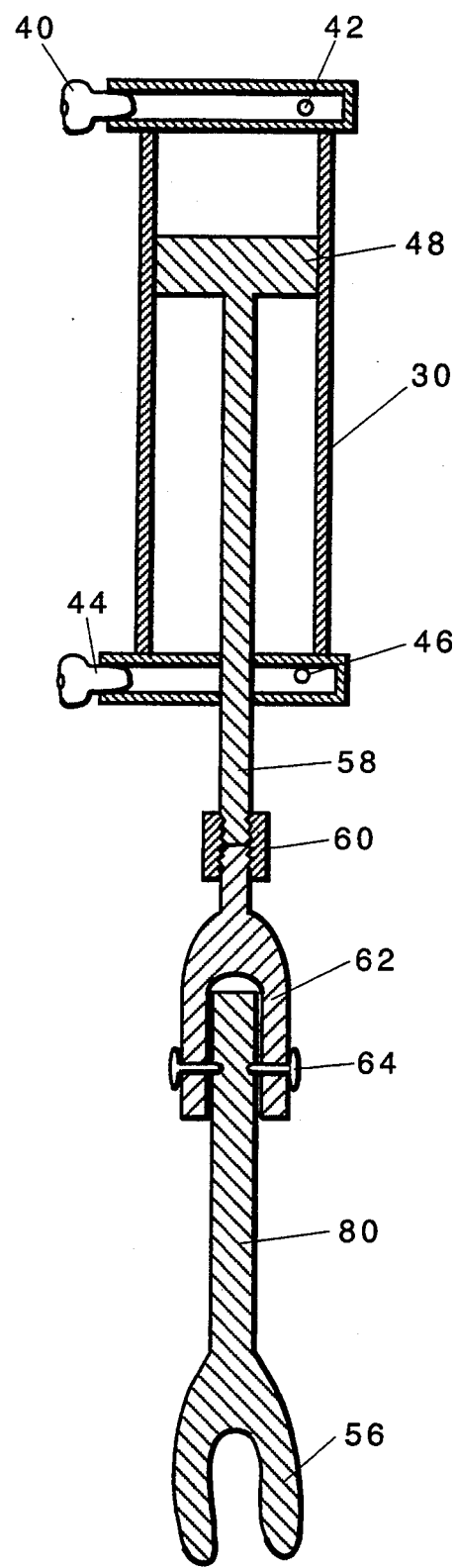
FIG. 3 is a cross sectional view of the linear actuator and rotatable link.

FIG. 3 shows one such linkage system. Connected to the extension rod 58 of internal piston 48 by a connector such as a bolt 60, is a yoke 62. Held in yoke 62 by rotational pins 64 is connecting link 80. The amount of horizontal motion allowed by pivoting about pins 64 is controlled by the depth of the space created between the base of the yoke 62 and the top surface of the connecting link 80; and by the diameter of the connecting link 80. As the link 80 rocks an outer portion approaches the base of the yoke 62 and upon reaching it cannot rotate further.

Figure 8:
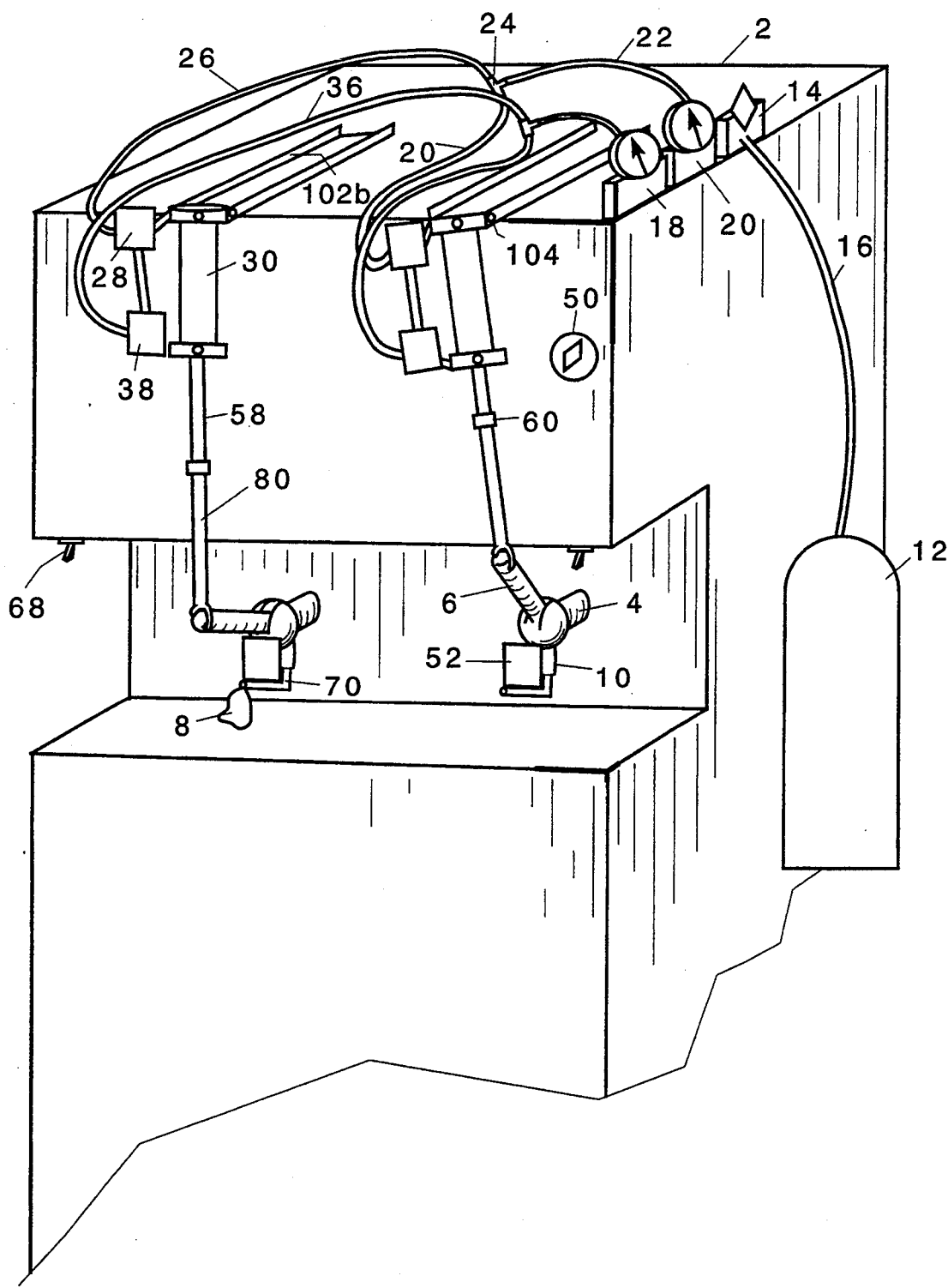
FIG. 8 is a view of an alternate adaptation of a soft serve dessert machine.

FIG. 8 shows an alternative adaptation system, in which the cylinder is pivotally mounted to a support 102b by pins 104.

Electrical power to the unit can be supplied by a separate cord 66, and individual units be taken off line by means of toggle switches 68.

Figure 5:
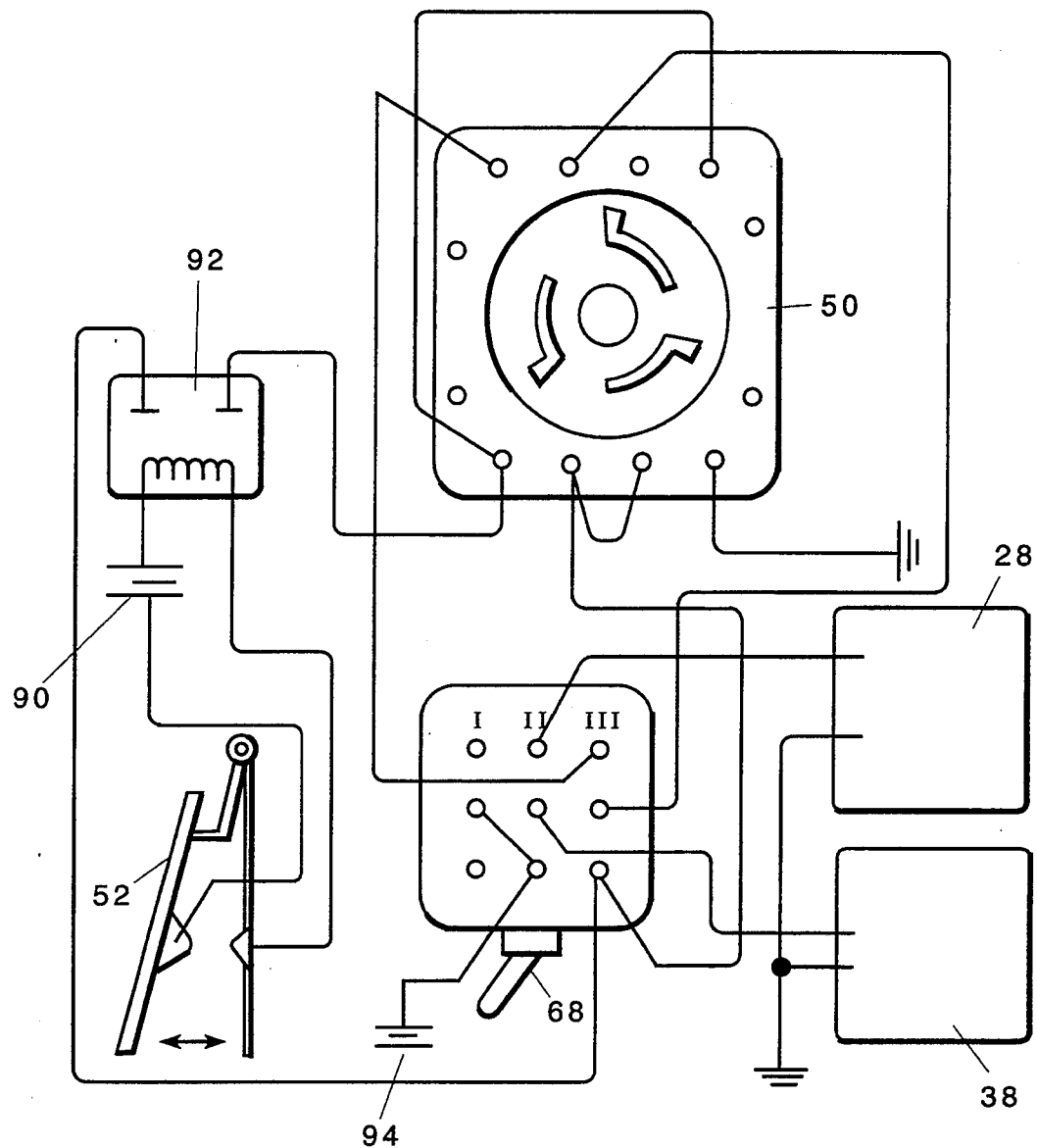
FIG. 5 is a view of the plate lever with a schematic electric circuit.

FIG. 5 shows an schematic for controlling the solenoid. When actuating plate 52 is depressed a circuit passes through anticipator 92. Voltage source 90 can be derived from the voltage of the frozen desert compressor if stepped down by means of a transformer. When the circuit is detected by the anticipator 92, electrical current flows to toggle switch 68. If the toggle 68 is in one position, column I is connected to column II such that the upper solenoid valve 28 has no connection, the lower solenoid valve 38 is connected to power source 94 (which may also be connected to the compressor) and power source 94 is not connected. This is the off-line position. If the toggle switch is in the alternate position, the solenoids are individually connected to the timer relay, and a pathway for current from the anticipator to the timer is completed.

The equipment is readily adaptable to coin operation. Rather than completing the anticipation circuit by depressing a plate 52, the circuit could be completed by a coin. Such a coin operated circuit is shown in U.S. Pat. No. 4,109,775, incorporated herein by reference. A dish could be placed in position for receiving the soft serve dessert in a manner similar to the way beverage cups are discharged in beverage vending machines. Such a cup dispenser is disclosed in U.S. Pat. No. 5,044,517 incorporated herein by reference.

The anticipation circuit could also be designed to be completed by an "electric eye". This could be used in vending or in automated production. In production, a pastry would come in line with the light beam signaling discharge of the soft serve dessert, allowing for automation of a production line.

A variety of discharge nozzles give the machine greater flexibility. Left open a regular port 10 can be used to fill cones or dishes. The addition of a short L shaped nozzle facilitates the injection of cream puffs. A longer L shape 70 having additional slots or apertures 72 on the spout is used for filling eclairs. Attachment of a hose would allow for filling cakes at a remote location. To accommodate the ports, a quickly changeable nozzle is used.

Figure 6B:
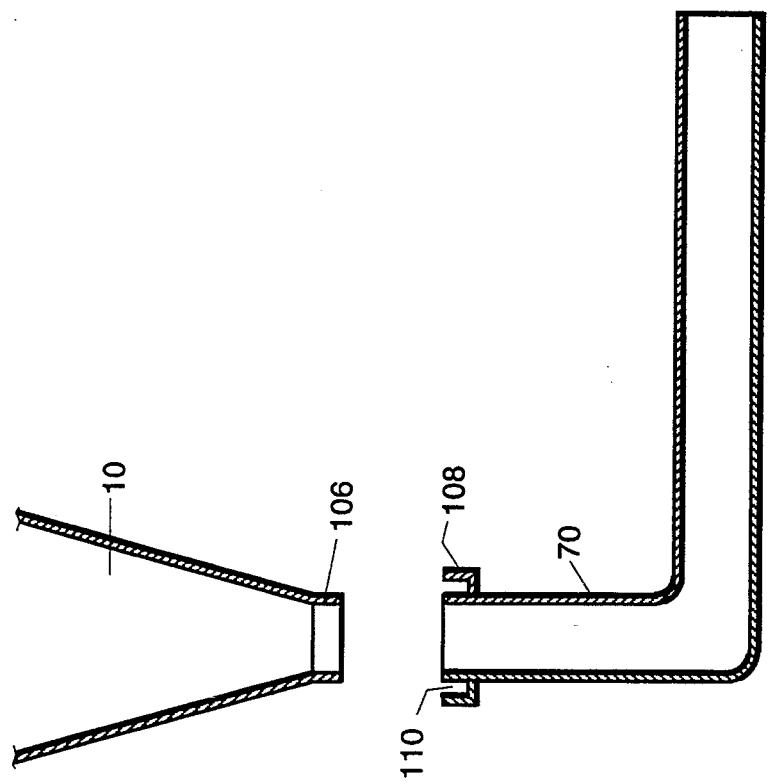
FIG. 6b is a cross sectional view of an alternate embodiment of an interchangeable nozzle for a cream puff.
Figure 6A:
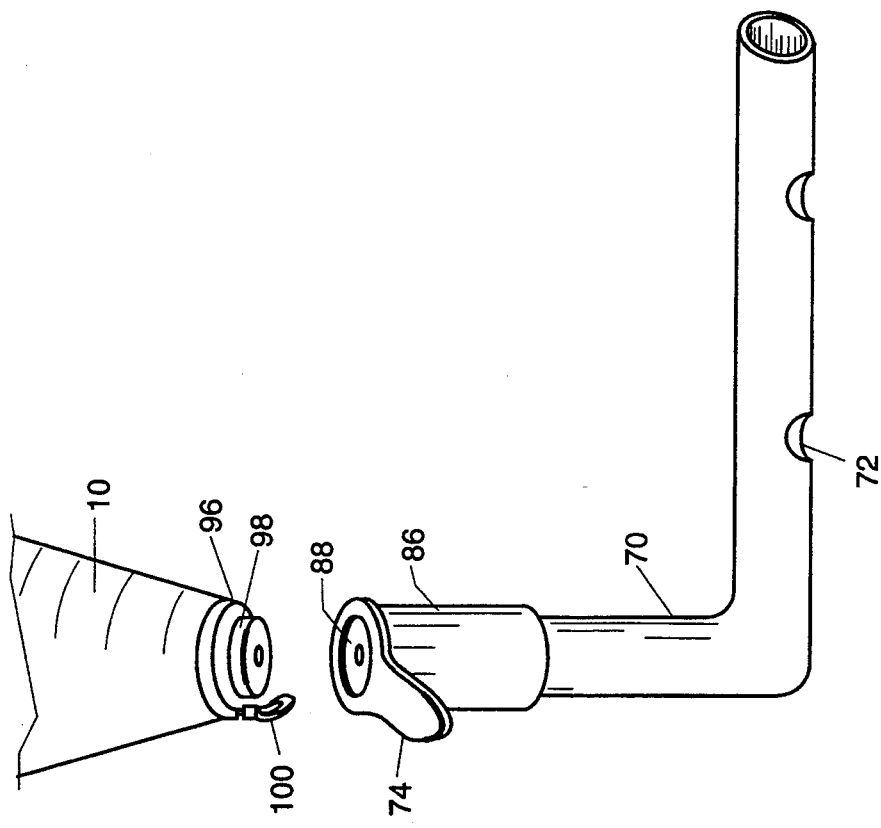
FIGS. 6a is a perspective view of an interchangeable nozzle, adapted for an eclair.
Figure 7:
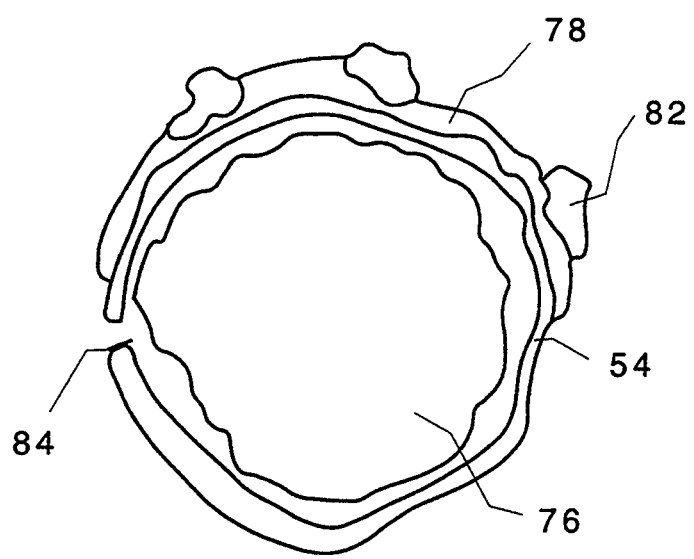
FIG. 7 is a view of a frozen dessert.

One nozzle is shown in FIG. 6a. An L shaped nozzle is equipped with a plastic hub 86 having a recess 88 and a wing 74. The port 10 is equipped with a matched fitting 96 having a snug fitting projection 98 and a grooved edge extension 100. At the top of the nozzle 70 is located a plastic hub having a wing 74. At the bottom of the regular port 10 is located a a receptacle for the hub having a slot for locking the wing 74 in a preset position.

A second nozzle is shown in FIG. 6b. Port extension 106 fits snugly into a recess 110 formed between the upper end of nozzle 70 and a plastic fitting 108.

While a fluid piston is disclosed as a linear actuator, other linear actuators could be attached to the yoke. Further, non-linear motions, such as those created by a cam could be harnessed for moving a tap lever.

While the timer described is an electrical relay, mechanical timers could also be used.

While the port disclosed is open and shut via a tap lever, making it possible to adapt existing machines, other port controls such as irises or a sliding plate are possible.

The above described embodiment using a Taylor Soft-Serve yoghurt machine model 8756-33 allows for an operator to fill from 50 to 200 soft ice cream puffs in a minute from one nozzle.

Suitable materials for the manufacture of the machine include stainless steel and plastics such as tygon for tubing and teflon for junctions.

To make the dessert, a baked good such as a pastry shell is volumetrically filled with a frozen dessert, iced, and then quickly frozen. Although baked goods are used here, it is possible that other shells such as chocolate figures popular during the holidays could be used.

One such dessert is a pate a choux shell 54, volumetrically filled with flavored soft frozen yogurt 76 through an aperture 84 in the shell 54, iced with a freeze stable chocolate icing 78 and quickly frozen in a nitrogen tunnel. Time for making the dessert from the start of filling to a fully frozen puff is about 30 min.

When the dessert is served, the shell 54 thaws prior to the soft frozen yogurt 76 and has a texture that tears rather than flakes.

Desserts processed in the above fashion can be shipped and sold at the retail level with little of the waste encountered in fresh eclairs and cream puffs and can be economically produced since excess fill is not required to avoid short-weighting. Further, nutritional labeling can be more accurate.

For variety, nuts 82 or other chunky topping such as sprinkles may be applied to the icing prior to freezing. Also the cream puff shell 76 may be flavored during baking. Suggested pate a choux flavorings include vanilla, chocolate, fruit, mocha, coffee, pistachio, almond, walnut, maple, rum cinnamon, butter, anisette and mint, Soft frozen desserts used for filling include ice cream, frozen yoghurt, and tofu based frozen desserts. A wide variety of flavors is possible. Suggested frozen dessert flavorings include vanilla, chocolate, fruit, mocha, coffee, pistachio, almond, walnut, maple, anisette, rum, cinnamon, caramel, butter, peanut, marshmallow, bubble gum, cookie dough and mint. Through the use of commercially available mixing ports, a multiple flavor (i.e. chocolate and vanilla) and color filling is achieved.

The inventor is unaware of a faster or more economical method and apparatus for producing these frozen dessert novelties.

What is claimed is:

1. An apparatus for extruding viscous materials comprising:
   a soft serve dessert mixer-dispenser having at least one dispenser port;
   means for opening an closing said port wherein said means for opening and closing said port is a tap lever;
   timing means connected to said opening and closing means;
   activating means connected to such timing means such that when said activating means is activated, said timing means causes said opening and closing means to open said port for a preset period of time, dispensing a volumetric portion of soft serve dessert.

2. The apparatus of claim 1 wherein said activating means is activated by pressure.

3. The apparatus of claim 1 wherein said means of opening and closing said port further comprises a linear actuator and link connecting said actuator to said tap lever; wherein said link connection is restrictedly rotatable to allow linear motion of said actuator to be transferred to nonlinear motion of said tap lever.

4. The apparatus of claim 3 wherein said linear actuator comprises a fluid driven piston and cylinder.

5. The apparatus of claim 4 wherein said activating means is pressure activated.

6. The apparatus of claim 5 further comprising means for interchangeably attaching filling nozzles to said port.

* * * * *